Nov. 2, 1937.   H. HASSENFELD   2,098,003
DIAL CARD
Filed May 4, 1935
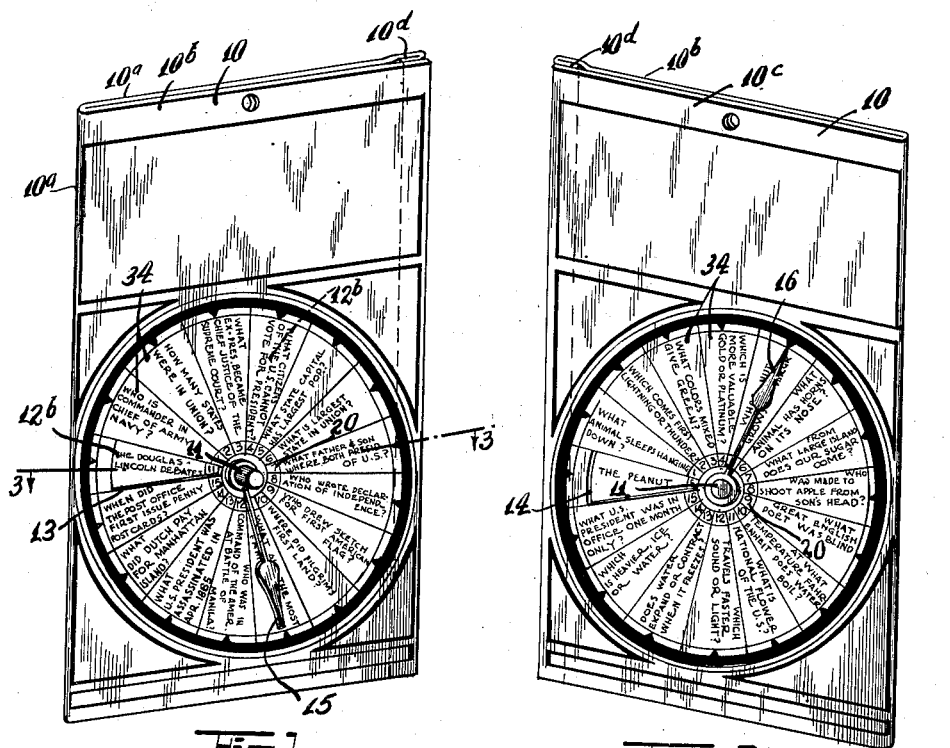
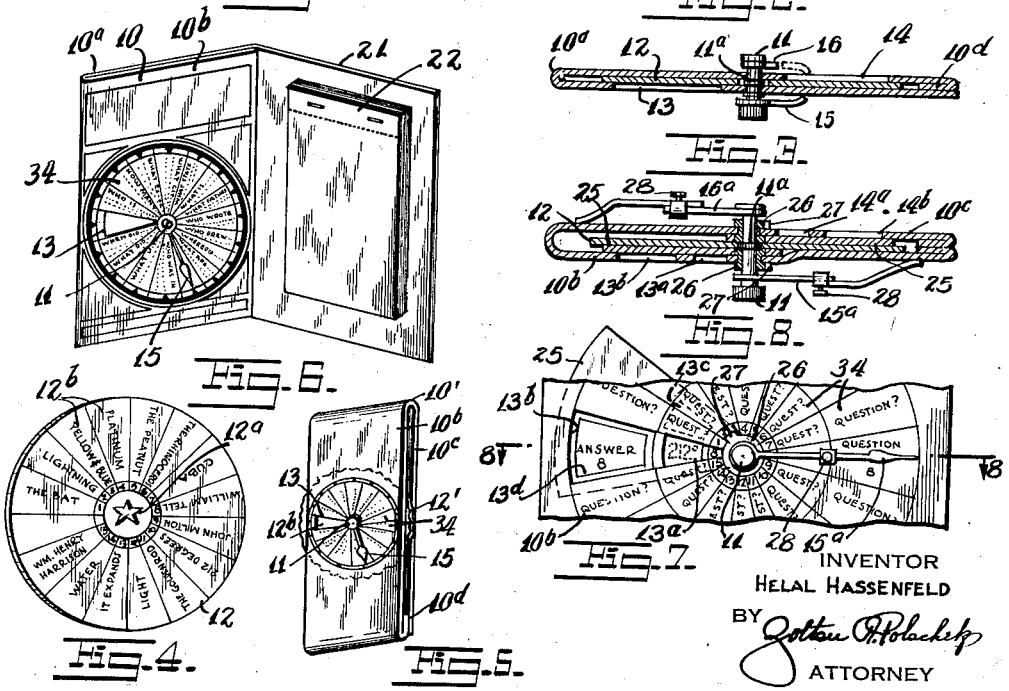
INVENTOR
HELAL HASSENFELD
BY
ATTORNEY Patented Nov. 2, 1937

2,098,003

UNITED STATES PATENT OFFICE 2,098,003

DIAL CARD

Helal Hassenfeld, New York, N. Y.

Application May 4, 1935, Serial No. 19,788

2 Claims. (Cl. 35—74)

This invention relates to new and useful improvements in a dial card.

The invention has for an object the construction of a dial card which is imprinted with a plurality of questions and which is provided with mechanism, when properly set, for answering said questions. Dial cards of this type will undoubtedly have great utility for the teaching of various subjects.

More specifically, the invention contemplates the construction of a device as mentioned which is characterized by a sheet of material having front and rear panels inscribed with questions and held slightly spaced from each other and secured together in fixed relation and equipped with a stud rotatively mounted therethrough, which stud supports a disc between the panels inscribed with a plurality of answers selectively viewable through windows in the panels and an arrangement for indicating the answers to the questions.

Furthermore, the invention proposes the provision of a pointer mounted on the stud and adapted to be placed over any one of the questions and arranged so that the answer to that question is viewable through the window.

Another one of the objects of this invention is an arrangement by which the panels of said sheet of material are held spaced so as to provide the space for the internal disc.

Still further the invention proposes arranging the questions and answers radially of said stud.

Another one of the objects of this invention is an arrangement whereby the radial areas of the panels and disc are divided into sections so that the number of questions and answers may be materially increased.

Another object of this invention is the provision of a shutter arranged to cooperate with the windows in the panels in such a fashion that certain of the windows may be covered when the answers relating to certain of the questions are not considered at the time.

Still further it is proposed to construct a device of the class described which is simple and durable and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a perspective view of a dial card constructed according to this invention.

Fig. 2 is a rear elevational view of Fig. 1.

Fig. 3 is a horizontal sectional view taken on the line 3—3 of Fig. 1.

Fig. 4 is a perspective view of the disc of the device.

Fig. 5 is a similar view to Fig. 1 but showing another form of the invention.

Fig. 6 is a view similar to Fig. 1 but showing the dial card associated with a cover equipped with a pad.

Fig. 7 is a fragmentary front elevational view of a dial card showing another embodiment of this invention.

Fig. 8 is a horizontal sectional view taken on the line 8—8 of Fig. 7.

The dial card, according to this invention, comprises a sheet of material 10 with a bent side $10^a$ forming a front panel $10^b$ and a rear panel $10^c$. These panels are held in spaced relation from each other by reason of one edge $10^d$ of the material being bent inwards and used as a separating means for the panels.

Along the top and bottom edges and the side edge equipped with the bent-in portion $10^d$, the panels are secured together with paste so that the sheet material is integrally joined, but at the same time is provided with an interior space.

A stud 11 is rotatively mounted through the panels $10^b$ and $10^c$. A disc 12 is fixed on the stud 11 and is disposed within the area between the panels. This disc 12 has an irregular central opening $12^a$ receiving a correspondingly shaped portion $11^a$ upon the stud for the fixed connection of these parts. The disc 12 is imprinted with a plurality of radial sections $12^b$ on both sides which are inscribed with answers to various questions. The panels $10^b$ and $10^c$ are formed with window openings 13 and 14 adapted to expose one answer on each face of the disc at one time. The sections $12^b$ of the disc are arranged radially thereof, and the window openings 13 are similarly arranged. The outer sides of the panels $10^b$ and $10^c$ are imprinted with a plurality of radial sections 34, each in turn imprinted with a different question, the answers to which are imprinted on the disc 12. The questions on the panels and the answers upon the discs are arranged in the same sequence so that it is possible to have the questions answered in a continuous fashion by turning the disc and viewing the answers through the windows.

A pointer 15 is affixed to one of the extended ends of the stud 11 and is operable over the questions of one of the panels, and other pointer 16 is fixed upon the other projecting end of the stud and is operable on the questions on the other panel. These pointers are so fixed relative to the stud that when they extend over particular questions the answers to those questions are exposed through the respective windows in the panels.

A feature of the invention resides in the fact that a person may read one of the questions, and if he is not familiar with the answer, place the pointer upon the question and read the answer through the window opening. In this manner children may be taught history, science, and other subjects.

Each of the sections 14 is provided with a numeral 20, and each of the sections 12$^b$ with a corresponding numeral so that these numerals act as a check to the answers of the questions. Thus, the possibility of the pointers being moved out of relation to their correct positions so that incorrect answers are given to the questions is counteracted by the check arrangement. If the number on the question section does not correspond with the number on the answer section this is an indication that the device is out of adjustment.

In Fig. 5, the bent side 10' is at the top of the card and front and rear panels 10$^a$ and 10$^b$ are narrower than disc 12. This arrangement permits the rotation of the disc 12 by the wavy edge 12'.

In Fig. 6 a modification of the invention has been disclosed wherein a cover 21 is attached to one edge of the device described in Figs. 1–4 inclusive, and acts in conjunction with the device to form the covers of a pad 22 which is attached on the cover 21. This pad may be used by a student to write his answers to the questions, or for any other purpose as desired.

In Figs. 7 and 8 another embodiment of the invention has been described wherein an arrangement is shown by which the number of questions and answers which the device is capable of giving is materially increased, with the arrangement shown in Figs. 1–4 the number of questions is limited to the number of possible radial sections into which the panels and the disc may be divided. With the form shown in Figs. 7 and 8 each of the radial sections is itself divided into sections and thus the increase previously specified is obtained.

More specifically, the panels 10$^b$ and 10$^c$ are formed with window openings 13$^a$ and 13$^b$, and 14$^a$ and 14$^b$, respectively. The window openings 13$^a$ and 13$^b$ are arranged on the panel 10$^b$ and in radial positions and the window openings 14$^a$ and 14$^b$ are arranged on the panel 10$^c$ and in radial positions. Shutters 25 are fixed on bushings 26 rotative on the stud 11. One shutter is arranged between the panel 10$^b$ and the disc 12 and another shutter is arranged between the disc 12 and the panel 10$^c$. These shutters have window openings 13$^c$ and 13$^d$ arranged in different angular and radial positions so as to be adapted in certain positions to cover the different window openings 13$^a$ and 13$^b$. Each of the bushings 26 is provided with a finger projection 27 by which the bushing may be turned to set the shutter.

The device furthermore is equipped with sectional pointers 15$^a$ and 16$^a$ adapted to be adjusted in length so as to point to different annular areas upon the panels. Set screws 28 mounted upon the pointers are adapted to hold the pointers in fixed positions. The panels are equipped with annular areas of questions, the answers to which are arranged in annular areas upon the disc 12 so that the answers are viewable through the window openings.

The operation of the device is as follows:—

The pointers 15$^a$ and 16$^a$ may be retracted to indicate over the questions on the inner annular area. The shutters 25 should then be adjusted so that the window openings 13$^b$ and 14$^b$ are covered and merely the window openings 13$^a$ and 14$^a$ are exposed to view. The answers to the questions are then obtained by properly setting the pointers to the questions and reading the answers through the window openings.

The questions upon the outer area may be indicated by extending the pointers and may be answered by adjusting the shutters to expose the windows 13$^b$ and 14$^b$.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a question and answer dial card comprising at least one panel of sheet material, a stud rotatably mounted through and held to said panel, a disc fixed on said stud and substantially covered by said panel, said disc and said panel having indicia in concentric circular columns and radial rows, said panel having a window of substantially equal shape and size to the shape and size of one of said radial rows of indicia on said disc for viewing selectively one radial row of indicia on said disc, said indicia on said panel and said disc comprising respectively questions and answers, an extensible pointer fixed on said stud and thereby rotatable with said disc, the answer to any question pointed out on said panel appearing through said window on said disc in corresponding radial position, said pointer being adjustable in length to the radial extent of the columns of said indicia on said panel, whereby to indicate the radial position of the answer.

2. In a question and answer dial card comprising at least one panel of sheet material, a stud rotatably mounted through and held to said panel, a disc fixed on said stud and substantially covered by said panel, said disc and said panel having indicia in concentric circular columns and radial rows, said panel having a window of substantially equal shape and size to the shape and size of one of said radial rows of indicia on said disc for viewing selectively one radial row of indicia on said disc, said indicia on said panel and said disc comprising respectively questions and answers, a shutter between said disc and said panel adjustably mounted for selectively covering all but one of said concentric circular columns on the radial row of indicia on said disc appearing through said window, an extensible pointer fixed on said stud and thereby rotatable with said disc, the answer to any question pointed out on said disc panel appearing through said window on said disc in corresponding radial position, said pointer being adjustable in length to the radial extent of the columns of said indicia on said panel, whereby to indicate the radial position of the question on said panel whose answer appears through said window.

HELAL HASSENFELD.